US012073323B2

(12) United States Patent
Mimassi

(10) Patent No.: US 12,073,323 B2
(45) Date of Patent: Aug. 27, 2024

(54) SYSTEM AND METHOD FOR INTELLIGENT SERVICE INTERMEDIATION

(71) Applicant: RockSpoon, Inc., San Jose, CA (US)

(72) Inventor: Nagib Georges Mimassi, Palo Alto, CA (US)

(73) Assignee: ROCKSPOON, INC., San Jose, CA (US)

( * ) Notice: Subject to any disclaimer, the term of this patent is extended or adjusted under 35 U.S.C. 154(b) by 0 days.

(21) Appl. No.: 17/408,450

(22) Filed: Aug. 22, 2021

(65) Prior Publication Data

US 2022/0292346 A1  Sep. 15, 2022

Related U.S. Application Data

(60) Provisional application No. 63/159,132, filed on Mar. 10, 2021.

(51) Int. Cl.
*G06N 3/08* (2023.01)
*G06F 40/20* (2020.01)
(Continued)

(52) U.S. Cl.
CPC ............ *G06N 3/08* (2013.01); *G06F 40/20* (2020.01); *G06F 40/30* (2020.01); *G06N 3/044* (2023.01)

(58) Field of Classification Search
CPC ........ G06N 3/08; G06N 3/0445; G06F 40/30; G06F 40/20
See application file for complete search history.

(56) References Cited

U.S. PATENT DOCUMENTS

2013/0227099 A1\* 8/2013 Hinton .................... H04L 67/56
                                                                  709/223
2018/0032908 A1\* 2/2018 Nagaraju ................ G06F 11/30
(Continued)

FOREIGN PATENT DOCUMENTS

WO       2021181095 A1    9/2021
WO   WO-2021181095 A1 *   9/2021   ............. G06Q 10/02

OTHER PUBLICATIONS

Zhou, Zhi, Xu Chen, En Li, Liekang Zeng, Ke Luo, and Junshan Zhang. "Edge Intelligence: Paving the Last Mile of Artificial Intelligence with Edge Computing." arXiv preprint arXiv:1905.10083 (2019). (Year: 2019).*

(Continued)

*Primary Examiner* — Casey R. Garner
(74) *Attorney, Agent, or Firm* — Galvin Patent Law LLC; Brian R. Galvin

(57) ABSTRACT

A system and method for intelligent service intermediation comprising a service intermediation server, which stores advanced global machine and deep learning models for natural language understanding, intent analysis, and constructing a central artificial intelligence that may be used to function as one intelligent service intermediary serving many parties, each acting in one or more roles, simultaneously, and a plurality of service edge devices which store local versions of the global machine and deep learning models and which use local data to train the local model. Service intermediation server has global state information associated with all services and edge devices it connects with and may use the global state information to generate predictions and optimizations in the form of service actions in order to intermediate actions between and among services and service participants. Service actions may be executed (Continued)

via service edge devices by a virtual assistant representing the central artificial intelligence.

12 Claims, 12 Drawing Sheets

(51) Int. Cl.
*G06F 40/30* (2020.01)
*G06N 3/044* (2023.01)

(56) References Cited

U.S. PATENT DOCUMENTS

| | | |
|---|---|---|
| 2018/0375806 A1 | 12/2018 | Manning et al. |
| 2019/0303428 A1 | 10/2019 | Munro et al. |
| 2019/0392307 A1 | 12/2019 | Liao et al. |
| 2020/0117690 A1* | 4/2020 | Tran ................ G06F 16/90332 |
| 2020/0272859 A1 | 8/2020 | Iashyn et al. |
| 2020/0410288 A1* | 12/2020 | Capota ................ G06F 9/5072 |
| 2021/0042645 A1* | 2/2021 | Sharma ............... G06F 16/2379 |
| 2021/0109785 A1* | 4/2021 | Prabhakaran ....... G06F 11/3058 |
| 2021/0117780 A1* | 4/2021 | Malik ................. G06K 9/3241 |
| 2021/0144517 A1* | 5/2021 | Guim Bernat ...... G06F 11/3006 |

OTHER PUBLICATIONS

Chen, Jiasi, and Xukan Ran. "Deep Learning With Edge Computing: A Review." Proceedings of the IEEE 107, No. 8 (2019). (Year: 2019).*

Wang, Xiaofei, Yiwen Han, Victor Leung, Dusit Niyato, Xueqiang Yan, and Xu Chen. "Convergence of Edge Computing and Deep Learning: A Comprehensive Survey." arXiv preprint arXiv:1907.08349 (2019). (Year: 2019).*

Xu, Dianlei, Tong Li, Yong Li, Xiang Su, Sasu Tarkoma, Tao Jiang, Jon Crowcroft, and Pan Hui. "Edge Intelligence: Architectures, Challenges, and Applications." arXiv preprint arXiv:2003.12172 (2020). (Year: 2020).*

Zhang, Jing, and Dacheng Tao. "Empowering Things with Intelligence: A Survey of the Progress, Challenges, and Opportunities in Artificial Intelligence of Things." arXiv preprint arXiv:2011.08612 (2020). (Year: 2020).*

* cited by examiner

SYSTEM AND METHOD FOR INTELLIGENT SERVICE INTERMEDIATION

CROSS-REFERENCE TO RELATED APPLICATIONS

Priority is claimed in the application data sheet to the following patents or patent applications, the entire written description of each of which is expressly incorporated herein by reference in its entirety:
63/159,132

BACKGROUND

Field of the Art

The disclosure relates to the field of intelligent systems, and more particularly to the field of edge learning supported virtual assistants.

Discussion of the State of the Art

With the increased penetration and proliferation of internet-of-things ("IoT") devices, and the continuous increase in connected, everyday devices (from smartphones to cars to check-out stands), the amount of data collected from the world is increasing exponentially. As a result there are growing privacy and security risk concerns associated with access to so much data, and the cost constraints on transmitting all that data for algorithm training purposes.

Furthermore, when a large plurality of these devices may be used by various services and participants to collect local data and process it for a variety of purposes dependent upon the service and participant. In some cases, these devices may be able to communicate with each other, but they may not be able to optimize functionality across devices of disparate services.

What is needed is a system and method for intelligent service intermediation which connects to a plurality of edge devices, which uses the processing power and local data collected via the edge devices to train global machine and deep learning models allowing data to remain private and secure on the edge device, and which uses the global models to construct a central intelligence layer that will consider each participants current role, location, and situation when interpreting language, intent, and optimizing interactions between services.

SUMMARY

Accordingly, the inventor has conceived and reduced to practice, a system and method for intelligent service intermediation comprising a service intermediation server, which stores advanced global machine and deep learning models for natural language understanding, intent analysis, and constructing a central artificial intelligence that may be used to function as one intelligent service intermediary serving many parties, each acting in one or more roles, simultaneously, and a plurality of service edge devices which store local versions of the global machine and deep learning models and which use local data to train the local model. Service intermediation server has global state information associated with all services and edge devices it connects with and may use the global state information to generate predictions and optimizations in the form of service actions in order to intermediate actions between and among services and service participants. Service actions may be executed via service edge devices by a virtual assistant representing the central artificial intelligence.

According to one embodiment, a system for intelligent service intermediation is disclosed, comprising: one or more service edge device(s) comprising at least a plurality of programming instructions stored in a memory of, and operating on at least one processor of, a computing device, wherein the plurality of programming instructions, when operating on the at least one processor, cause the computing device to: receive updated machine and deep learning global model parameters; apply the updated machine and deep learning global model parameters to the local models stored in the service edge device; receive local data from service edge device sensors and other input mechanisms; feed the received local data as input into one or more of the updated local machine and deep learning models to generate output actions responsive to a service edge device user query; execute output actions and set up processes necessary for fulfillment of the service edge device user query; generate a voice or text message relayed by a virtual assistant indicating that the service edge device user query has been received, understood, and an action responsive to the user query has been initialized or completed; train and update local machine and deep learning models using the received local data; upload trained and updated local model parameters to a service intermediary server; and execute service actions received from a service intermediary server; and a service intermediary server comprising at least a plurality of programming instructions stored in a memory of, and operating on at least one processor of, a computing device, wherein the plurality of programming instructions, when operating on the at least one processor, cause the computing device to: select a subset of service edge devices to upload trained and updated local model parameters; aggregate the received updated local model parameters from the subset of service edge devices and compute the average value of the local model parameters; update the machine and deep learning global models using the computed average values of the local model parameters as new global model parameters; send the updated machine and deep learning global models to the one or more service edge devices; receive and store global data from service edge devices and external sources; feed the global data into the machine and deep learning global models to generate as output a service action; and send the service action to one or more service edge devices for execution.

According to another embodiment, a method for intelligent service intermediation, is disclosed, comprising the steps of: receiving updated machine and deep learning global model parameters; applying the updated machine and deep learning global model parameters to the local models stored in the service edge device; receiving local data from service edge device sensors and other input mechanisms; feeding the received local data as input into one or more of the updated local machine and deep learning models to generate output actions responsive to a service edge device user query; executing output actions and set up processes necessary for fulfillment of the service edge device user query; generating a voice or text message relayed by a virtual assistant indicating that the service edge device user query has been received, understood, and an action responsive to the user query has been initialized or completed; training and update local machine and deep learning models using the received local data; uploading trained and updated local model parameters to a service intermediary server; executing service actions received from a service intermediary server; selecting a subset of service edge devices to upload trained and updated local model parameters; aggregating the received updated local model parameters from the subset of service edge devices and compute the average value of the local model parameters; updating the machine and deep learning global models using the computed average values of the local model parameters as new global model parameters; sending the updated machine and deep learning global models to the one or more service edge devices; receiving and store global data from service edge devices and external sources; feeding the global data into the machine and deep learning global models to generate as output a service action; and sending the service action to one or more service edge devices for execution.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
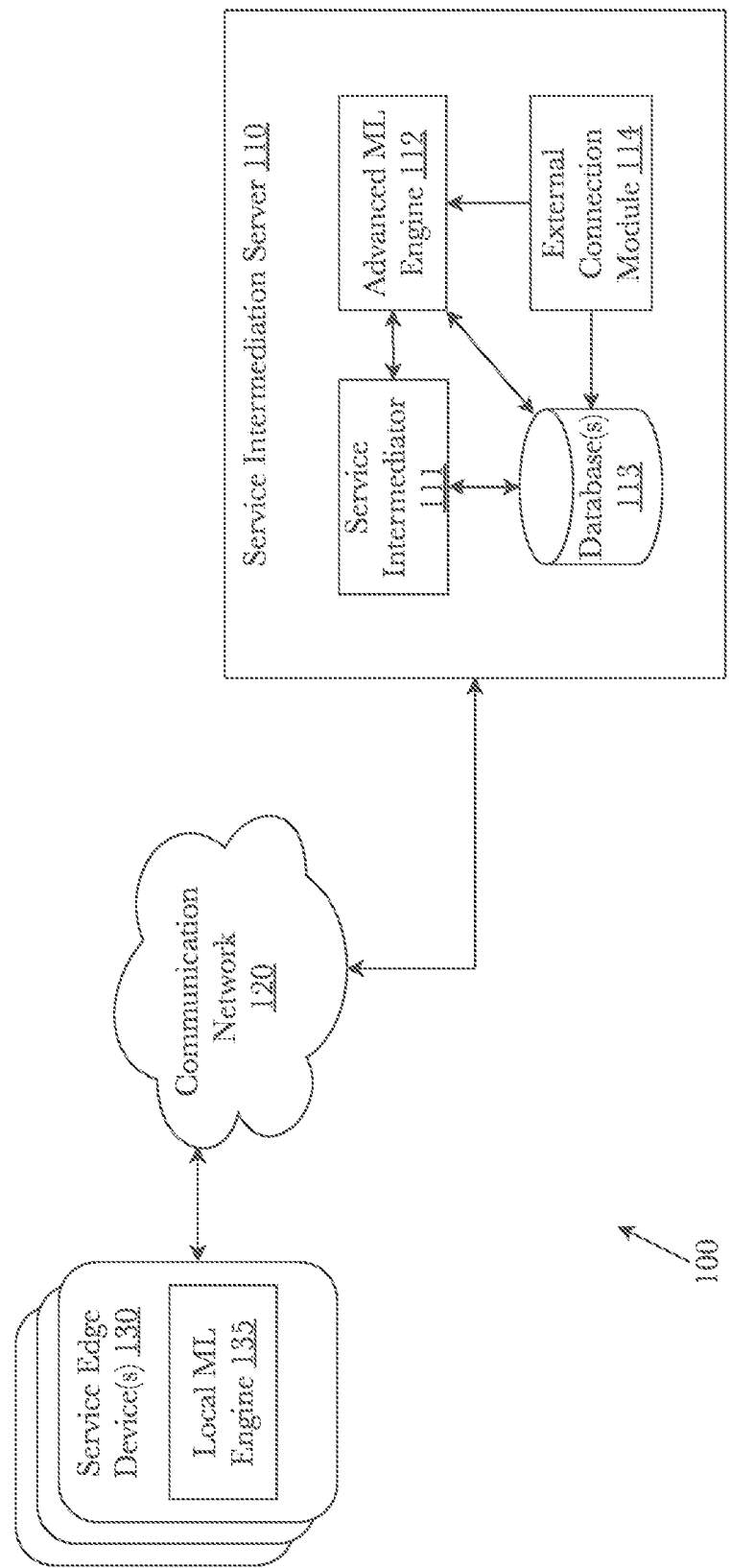
FIG. 1 is a block diagram illustrating an exemplary system architecture for intelligent service intermediation, according to one aspect.

The inventor has conceived, and reduced to practice, a system and method for intelligent service intermediation comprising a service intermediation server, which stores advanced global machine and deep learning models for natural language understanding, intent analysis, and constructing a central artificial intelligence that may be used to function as one intelligent service intermediary serving many parties, each acting in one or more roles, simultaneously, and a plurality of service edge devices which store local versions of the global machine and deep learning models and which use local data to train the local model. Service intermediation server has global state information associated with all services and edge devices it connects with and may use the global state information to generate predictions and optimizations in the form of service actions in order to intermediate actions between and among services and service participants. Service actions may be executed via service edge devices by a virtual assistant representing the central artificial intelligence.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Edges" as used herein means connections between nodes or vertices in a data structure. In graphs, an arbitrary number of edges may be assigned to any node or vertex, each edge representing a relationship to itself or any other node or vertex. Edges may also comprise value, conditions, or other information, such as edge weights or probabilities.

"Nodes" and "Vertices" are used herein interchangeably to mean a unit of a data structure comprising a value, condition, or other information. Nodes and vertices may be arranged in lists, trees, graphs, and other forms of data structures. In graphs, nodes and vertices may be connected to an arbitrary number of edges, which represent relationships between the nodes or vertices. As the context requires, the term "node" may also refer to a node of a neural network (also referred to as a neuron) which is analogous to a graph node in that it is a point of information connected to other points of information through edges.

Conceptual Architecture

FIG. 1 is a block diagram illustrating an exemplary system architecture 100 for intelligent service intermediation, according to an aspect. According to an embodiment, the system may comprise an intelligent service intermediation server 110 which acts as a central intelligence for and with global awareness of a large plurality of service edge devices 130. The service edge devices 130 may communicate and exchange data with the service intermediation server 110 via a communication network 120 such as the internet, local area network ("LAN"), wide area network ("WAN"), wireless networks and protocols such as WIFI and Bluetooth, and mobile networks such as code-division multiple access ("CDMA") and other suitable communication networks known in the art.

According to an embodiment, service intermediation server 110 may comprise one or more databases 113 which may store models and model parameters, data received from service edge devices 130, previous model states, business rules (manually inputted, learned, or some combination of the two), domain specific knowledge base, enterprise data such as: hours of operation, point-of-sale data, inventory data, scheduling data, distributor data, items for sale, and geographic location, external data, etc., an external connection module 114 which may be used to retrieve data from external sources via calling API functions over HTTP, sending raw data over FTP or TCP ports, etc., an advanced machine learning engine 112 which may contain one or more machine and deep learning algorithms which can be used by the server 110 to simulate, predict, and optimize actions between and among connected services, and a service intermediator 111 which may receive service action suggestions from the advanced ML engine 112 and communicate with service edge devices 130 to coordinate and facilitate the suggested service actions and to facilitate global and external data exchange between server 110 and edge devices 130 to provide proactive service intermediation. For illustrative and exemplary purposes only, the disclosed system will be discussed primarily in a restaurant business context, but may be applicable to any business enterprise.

According to an embodiment, advanced machine learning ("ML") engine 112 may contain one or more machine and deep learning algorithms (e.g., natural language understanding, natural language processing, sentiment and intent extraction, long short term memory neural networks, etc.) which can be used by the server 110 to learn, optimize, plan, schedule, and simulate service actions to be carried out by various system users via their service edge devices or by the service edge devices only without user intervention. The advanced ML engine 112 and local ML engine 135 may use stochastic gradient descent ("SGD") as a standard optimizer, but other optimizing techniques and functions known in the art may be used in other embodiments. One purpose of service edge devices 130 is to train high quality model(s) while training data remains distributed over a large number of edge devices. In an embodiment, a local ML engine 135 may contain the instances of learning algorithms running on the service edge devices 130, all rely on a shared model for their training. In a series of rounds, each device, after downloading the current model (or what it takes to deduce it) from the server 110, independently computes some form of update to that model based on its local data and context. Service edge device 130 communicates this update back to the server, where the updates are aggregated to compute a new global (advanced) model. During the process, the training data remains on the edge devices. For example, the server may request a subset of service edge devices 130 to send their computed and updated model parameters (e.g., model weights, coefficients, gradients, model update, etc.), receive the updated model parameters, aggregate and compute the average value of the received model parameters, then update the advanced model with the computed average parameter values, according to an embodiment. Service edge devices 130 can still send data to the server 110 when needed, but the ability to process some data locally allows for screening of the data sent to the server 110 while also making real-time data processing and response possible. In this way, the server 110 can use information from a plurality of sessions spread across a broad range of users to train one or more advanced global machine learned algorithms, allowing information from a first user session to influence the session of a second user, while maintaining data privacy and user anonymity.

The system 100 may provide real-time intelligent predictions and optimizations to system users. The concept of real time may vary depending on the type of intelligent decisions and the service actors involved. For instance, the system 100 may operate within a restaurant at as close to real time as allowed by the constraints of the devices and communication networks 120 used within the system. For example, when a service edge device user may be a patron dining in a system connected restaurant and the patron's edge device may recognize the restaurant as part of the system and allow the patron's device to begin listening to the background noise. The patron's device may hear the patron complaining about the service they have received or the meal they have ordered. Responsive to the heard patron's complaints, the system 100 may send an alert to the restaurant manager's edge device, and the manager may be able to approach the patron and remediate the patron's complaints. This type of interaction requires near real-time intelligent decision making in order to enhance the experience of all participating actors (e.g., patron's, servers, managers, restaurant, etc.). As another example, the system 100 may be monitoring a restaurant's supply chain and may be operating on a fifteen-minute delay in order to aggregate adequate data to make intelligent choices.

According to an embodiment, service intermediary server 110 may request data from and transmit data to one or more of the service edge devices in order to gain insight and awareness of processes and operations of participating actors (e.g., consumers, employees, restaurants, etc.). Service intermediary server 110 or one of its components, such as service intermediator 111, may allow a subset of edge devices 130 to recognize or otherwise become aware of other edge devices grouped within the subset. A subset may be chosen based on a variety of factors, for example, geographic location of edge devices 130 and participants, type of participant role (e.g., consumer, server, manager, driver, barkeep, hostess, etc.), and communication channel conditions (e.g., network latency levels). A subset of devices that share awareness of each other may be described as an awareness layer within a network comprised of all connected edge devices and managed by service intermediary server 110. This may be referred to as a federated awareness architecture for the network and may allow edge devices 130 and their local ML engines 135 operating within the awareness layer to generate suggestions and optimizations using shared data and context collected from all service edge devices 130 within the layer. Furthermore, service intermediary server 110 may request model updates from all or a subset of devices grouped in the same awareness layer in order to update the advanced models located in the advanced ML engine 112. These updated advanced models may then be distributed only to service edge devices 130 grouped within the awareness layer that contributed model updates. In this way local models may become layer models which may increase the accuracy and usefulness of the suggestions and optimizations generated by and for edge devices 130 grouped in the awareness layer.

In some embodiments, there may be multiple service intermediary servers 110 communicating with each other, and each server may be assigned to a different group or layer of service edge devices 130. In this arrangement, each server may contain global layer models trained on only local model updates received from its connected group of edge devices 130. This arrangement of multiple intermediary servers 110 still allows for one global model to be shared amongst all devices and servers, instead of allowing each server to train separate global layer models.

According to an embodiment, advanced ML engine 112 may contain one or more layers of machine and deep learning algorithms. According to an embodiment, advanced ML engine 112 may comprise the global model for an advanced natural language understanding ("NLU") algorithm. The advanced NLU model may be developed from a variety of ML algorithms known in the art (e.g., Naïve Bayes, decision tree, support vector machines, recurrent neural network, etc.). For example, in one embodiment the advanced NLU model may be developed using a long short term memory ("LSTM") neural network, which is known in the art to be well suited for time series or serial data, such as speech and text based data, where the order of the data (words, strings) is important to contextualizing and analyzing the data. Additionally, LSTM neural networks are able to "remember" previous states via its memory mechanism, which is useful in a NLU context because using previous speech or text patterns to determine intent and context is key to building a well-developed and useful classifier to support NLU tasks. The advanced NLU model may then be distributed to service edge devices 130 for training inside local ML engine 135. The local NLU model may be used to facilitate a virtual assistant ("VA") which can respond to spoken and text-based user queries and requests to execute functions and actions.

The VA operating on a service edge device 130 may further receive service actions from service intermediary server 110 in order to optimize the experience or role of the edge device user. For example, a service edge device user may be getting ready to leave work and asks the VA to order dinner for pickup from an Italian restaurant that is on her path home. The VA could access the user's preferences stored on the edge device to identify Italian meals the user prefers to order as well as any preferred Italian restaurants that the user likes to dine at. Additionally, the VA could access device GPS and on-device navigation application such as GOOGLE MAPS™ to locate an Italian restaurant on the user's typical route from work to home. Then the VA could look up the restaurant's phone number and connect the user to the restaurant via phone, or online order portal, if such a portal exists, and place an order for pick-up for the edge device user. Finally, intelligent service intermediary system 100 may be connected to the Italian restaurant and can track the preparation of the user's meal, and may be able to send a service action to the user's device to inform the user to leave work at a certain time in order to ensure the meal is just being placed in to-go containers as the user arrives to the Italian restaurant. Alternatively, the device user may run into traffic on her way from work to the Italian restaurant, and the server 110, receiving the traffic data from the edge device, has awareness of the unexpected traffic and could send a service action suggestion to the kitchen staff to delay preparation of the user's order by ten minutes in order to ensure the food is hot and ready when the edge device user arrives to the restaurant.

According to an embodiment, advanced ML engine 112 may contain one or more machine and deep learning algorithms (e.g., LSTM, graph-based neural networks, regression algorithms, etc.) in order to develop a central artificial intelligence ("AI") which can suggest service actions to be carried out by participating system users, such as consumers, restaurants staff, drivers, and distributors, in order to optimize participants activities and experience. Connected (edge) devices now capture unthinkable volumes of data: every transaction, every customer gesture, every micro- and macroeconomic indicator, all the information that can inform better decisions. According to an embodiment, the central AI may be developed using principal component analysis ("PCA") which uses an orthogonal transformation which converts a set of correlated variables to a set of uncorrelated variables. PCA is widely used in ML for predictive models in order to examine the interrelations among a set of variables. This approach allows the AI to learn how a large group of variables can contribute to a desired outcome and which variables are superfluous. For example, the server 110 could leverage the AI to analyze a plurality of data such as point-of-sale data, location data, weather data, distributor data, employee data, and consumer data to suggest business actions to a restaurant to optimize its profits. Other models (e.g., regression model) known in the art may be selected in place of PCA to develop the central AI.

According to an embodiment, service edge devices 130 may analyze and process incoming data at the source and determine what needs to be processed by more powerful advanced algorithms in the server 110, versus what can be processed locally. For example, if an edge device user asks the system virtual assistant, "Order one of my favorite meals for me," the user's list of favorite meals from local restaurants are stored in and processed by the device's local hardware. This will not require sending data to or requesting data from the server 110. The edge device can execute the function and keep the user happy without bogging down the server network. If instead, the edge device user asks, "Schedule a dinner reservation at restaurant X with friends Tina and Mike," the device will need to search an external source (e.g., Tina and Mike's respective schedules) for that data.

Service edge devices 130 may be programmed with an application ("App") that comprises a local ML engine 135 and a virtual assistant ("VA") that may use local ML engine 135 to develop context-sensitive speaker models based upon natural language understanding and processing, and intent and sentiment analysis carried out via local and advanced models. The VA could then help with a variety of tasks responsive (and sometimes proactive) to a user request. For example, a consumer in a car may click on his phone while driving, say an alert word such as "ROXY" and the application may verbally guide the user, or the user may say "ROXY" as the alert word and interact directly with the VA. A user may be able to interact with the VA to select a restaurant and make reservations, order for pickup or delivery, or on-site consumption, and arrange for others to join the user for dinner. This requires situational awareness of each participating consumer's location, traffic, venue conditions, and so forth. Some of the information may be available to the edge device immediately such as location data, but other data such as venue conditions, may need to be requested and retrieved from the server 110 in order for the VA to respond to user requests.

According to an embodiment, the service intermediation server 110 acts as a central intelligence that can process service requests and build advance models of the world in order to function as one virtual assistant that acts as a service intermediary in real-time. The intelligent service intermediation system 100 may consider each participant's current role, location, and situation when interpreting language, intent, and when optimizing. The server and VA can be used to link servers, managers, and consumers of a service. For example, service intermediation server 110 may be implemented in a restaurant business context in order to learn, manage, simulate, and optimize business decisions in order to provide optimal service experiences. For example, the system 100 may be used to coordinate and facilitate actions between a restaurant and food distributor, it may be used to coordinate and facilitate actions between restaurant front of house and kitchen staff, or it may be used to coordinate and facilitate actions between consumers and restaurants among many other uses. The definition of optimal varies by type of user and individual user and may be learned by the system 100 over time. The VA is distributed which means it operates on many devices simultaneously, but also has a central "brain" (server) that figures out the tactical picture and adjusts by nudging (e.g., suggested service actions) actors in real time using. The VA may take on multiple roles simultaneously each with its own persona and optimization goals. For example, "consumer" persona is looking to optimize the consumer experience, "server" persona is looking to optimize server effectiveness and earnings, "barkeep" persona is looking out for the venue, the barkeep, and consumer safety, "management" persona is keeping an eye on all the parts and helping management staff react to events proactively and effectively, various "logistics" personae help food delivery drivers, truckers, and distributors optimize delivery and distribution, and "environmental" personae watch weather, events, traffic, etc., to keep everyone informed. The meaning of persona is purposely generalizable and one person may have several personas, each with its own language model and preferences. For example, the VA persona for a patron at a high-end restaurant may be different for when that same patron is dining at a restaurant where she also works. There may be several personas for different work roles, some people may cook, serve, and manage at various times (and various venues). A person working as a cook may receive different optimization suggestions from the VA compared to a when that same person is working as a server. For example, a restaurant employee working as a cook and the VA may suggest, informed by global state data such as a food delivery driver's schedule and current location) to delay starting a food order by five minutes in order to ensure the food order is hot and ready when a delivery driver arrives at a restaurant. The system 100 may provide one service intermediary serving many parties, each acting in one or more roles (personas), simultaneously.

There are also service provider users (e.g., servers, barkeeps, greeters, managers, etc.), service consumers (patrons in restaurants and picking up or getting deliveries), and service providers such as drivers, suppliers, etc. Service intermediation server 110 acts as one central "intelligence" operating across all of these, including among many restaurants including different ownership, to provide optimal service experiences for all parties.

The service intermediation system and the VA may be distributed across multiple roles within a venue (e.g., server VA, consumer VA, manager VA, delivery driver VA, etc.), distributed across many venues which may or may not be jointly owned and that may or may not be located geographically close to each other. The VA may be distributed to different service edges which send updated locally trained models to and exchange select data with the cloud-based intermediation server 110 which has a global awareness of the overall state of the distributed service edges. The intermediation server 110 may store global state information in one or more database(s) 113 and may include the global state information as input into the advanced models contained within advanced ML engine 112 in order to intermediate actions and processes between one or more services.

According to an embodiment, service edge devices 130 may only perform local model training when the device is charging, the device user is not engaged with the device, and when the device is connected to a free network (e.g., WiFi). Training may be done in this way in order to ensure that the device's processing power is not split between normal device usage and local model training, and to reduce any inconvenience for the device user. This allows for the advanced models stored within the intermediation server 110 to be trained in a federated learning style which utilizes the processing and data gathering capabilities of modern mobile devices such as smart phones, tablets, laptop computers, and the like.

By employing a federated learning approach to advanced model training and building, the system removes the need for data gathered locally on a mobile device to be transmitted to service intermediation server 110, which reduces latency by removing the need to upload gathered data to the server. Additionally, the security of mobile device user data is preserved as the data can remain on the mobile device instead of being uploaded to the server. The models stored on the mobile device may be trained locally using data gathered from the mobile devices on-board sensors, for example microphones, camera, motion sensors (accelerometer, gyroscope, etc.), proximity sensors, ambient light sensors, compass ("GPS"), barometers, biometric sensors (fingerprint scanner, face scanner), thermal sensors, and lidar. In addition to on-board sensors, mobile device data may be gathered from other applications stored on the mobile device, for example weather data and traffic data may be retrieved from applications running on the mobile device, or accessed via the internet through an application programming interface ("API") associated with the data source.

Figure 2:
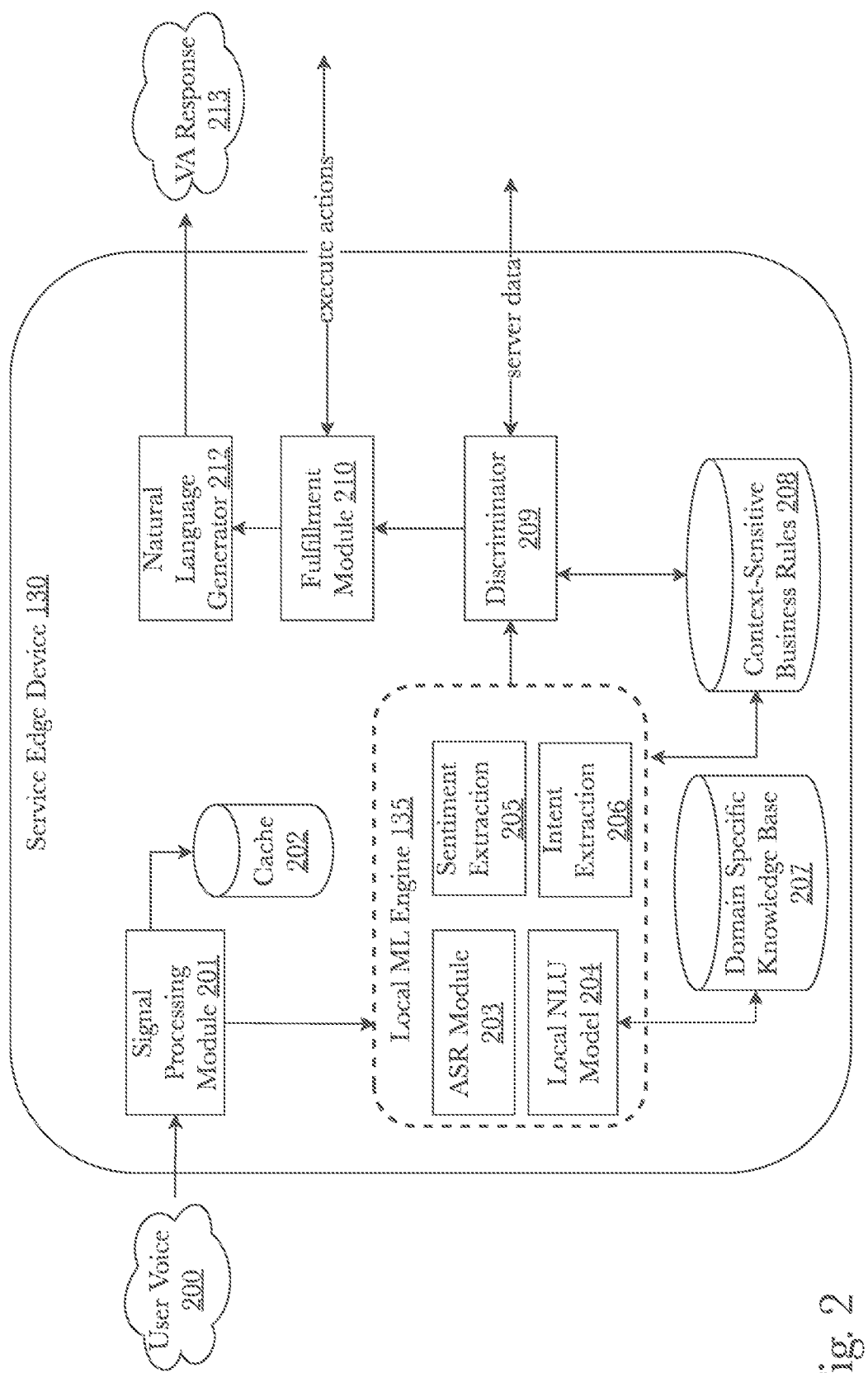
FIG. 2 is a block diagram illustrating an exemplary system architecture for a virtual assistant operating on a service edge device, according to one aspect.

FIG. 2 is a block diagram illustrating an exemplary system architecture for a virtual assistant operating on a service edge device 130, according to one aspect. According to an embodiment, queries and requests may be generated by the device user's voice 200 in order to activate the VA using a wake word or phrase. A device user may also interact with the VA using text-based queries and commands. Inside the device, a signal processing module 201 may be used for wake word detection. When a wake word is detected, the signal processing module may make an audio clip wave file of the device user's VA request and perform various signal processing functions such as background noise reduction, volume normalization, and frequency analysis. The audio clip may be temporarily stored in a cache 202 until the VA session with the device user has concluded, at which point it may be deleted. The resulting filtered wave form is then forwarded to local ML engine 135 and passed through an automated speech recognition ("ASR") module 203 where it may be broken down into what are called phonemes. Phonemes are the basic building block sounds of language and words. For example, English has 44 of them, consisting of sound blocks such as "wh", "th", "ka", and "t". Each phoneme is like a chain link and by analyzing them in sequence, starting from the first phoneme, the ASR module may use statistical probability analysis to deduce whole words and then from there, complete sentences. Then the local, context-sensitive NLU model 204 may be used to determine and extract intent 205 and sentiment 206 from the user voice request. Context-sensitive refers to using local data such as the user's role, location, and situation when interpreting language, intent, and when executing functions responsive to user queries. To support the local NLU model 204, the device may store domain specific knowledge base 207 which may be used to provide NLU with further context specific to the domain of the current user's role. For example, a device user may be working as a server in a restaurant and the domain specific knowledge base 207 may contain common phrases or sentences that the user typically only speaks in the context of being a restaurant server. The local ML engine 135 and its algorithms perform active learning where data is stored from past interactions as the ASR module 203 and NLU model 204 gets to know the words, and combinations of words, the device user most often use. As an example of active learning, text-messaging applications in which an auto-correct is repeatedly denied, the system will begin to treat the 'incorrect' word as a word in its own right.

Once the local ML engine 135 has determined the intent and sentiment of the user query, a discriminator 209 may decide when to act solely locally, when to start acting while seeking centralized direction or information from the service intermediary server 110, and when to wait for centralized direction or information. The system may further comprise context-sensitive business rules 208 stored in the memory of the edge device 130. Context-sensitive business rules 208 may be for example, one of or some combination of pre-defined rules input by the edge device user, a business enterprise associated with the edge device (e.g., corporate or company phone), and context-sensitive business rules 208 learned, derived, and augmented via the local ML engine 135 algorithms. These rules may be used by local ML engine 135 for adjusting weights and thresholds of the machine and deep learning algorithms operating and training on the edge device 130. These rules may also be used by discriminator 209 when determining if data or service actions are required from service intermediary server 110. Additionally, context-sensitive business rules 208 may be used as inputs to the one or more machine and deep learning models located in the local ML engine 135 when generating local predictions and optimizations.

A fulfillment module 210 may be used to execute actions and set up processes in order to respond to a device user's query. For example, if the device user speaks the wake word and asks the VA to play some music, then the fulfillment module would connect to a music application X on the edge device 130 and begin playing music. Once actions or processes have been implemented then a natural language generator 212 may be used to for dialogue management and text-to-speech capabilities. Natural language generator 212 may use the output of the NLU model 204 as well as the extracted intent and sentiment in order to choose the most appropriate response 213 to the user query. Continuing the proceeding example, using the natural language generator 212 the VA may respond 213 by speaking the following, "Sure thing, playing music from application X".

Figure 3:
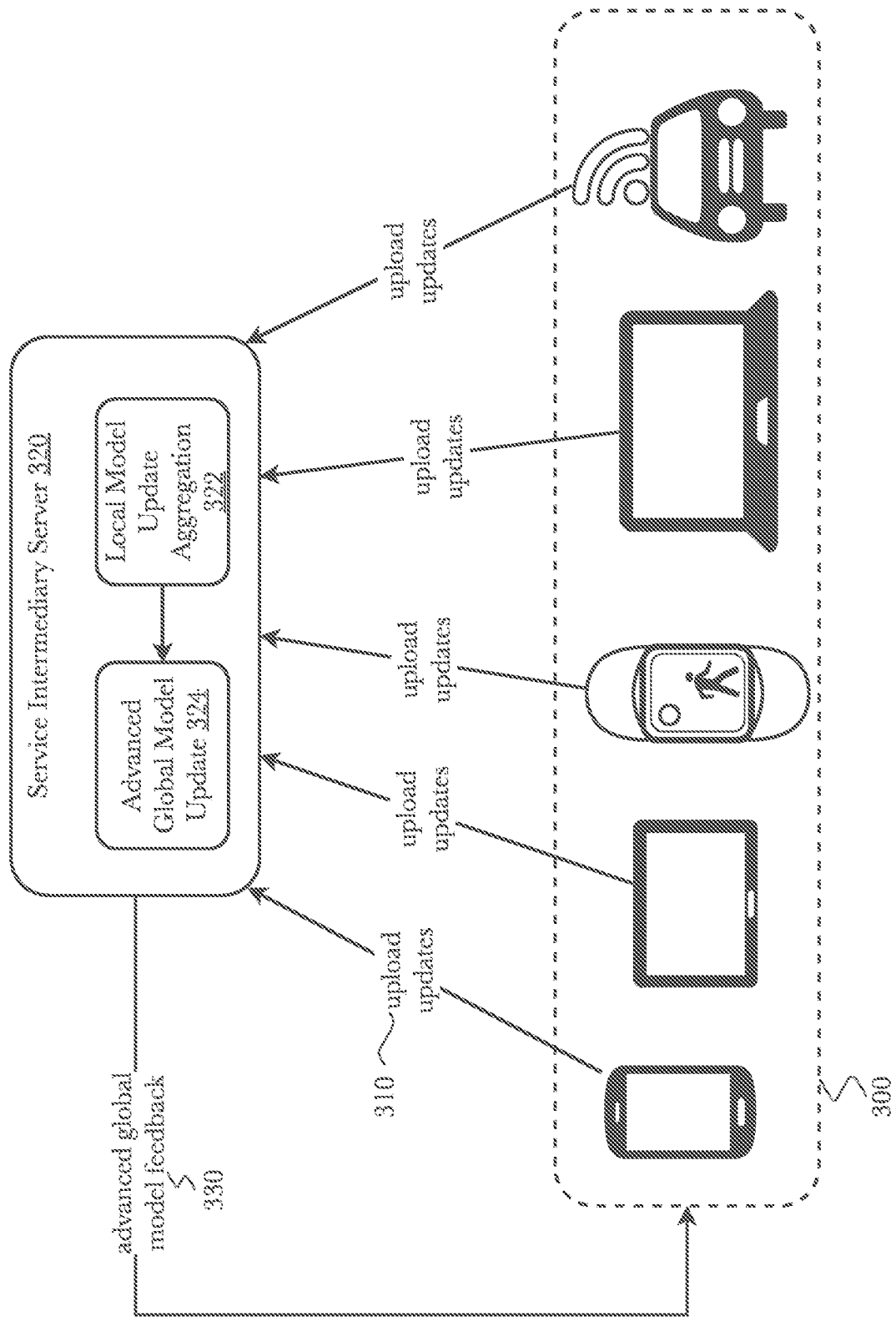
FIG. 3 is a diagram illustrating the data flow of an exemplary service intermediary server global model learning update, according to one aspect.

FIG. 3 is a diagram illustrating the data flow of an exemplary service intermediary server global model learning update, according to one aspect. According to an embodiment, Service edge devices 300 may have stored and operating on their systems software (e.g., mobile device application) which provides machine and deep learning models to facilitate an interactive voice assistant supported by artificial intelligence. The machine and deep learning models stored and operating on the service edge devices 300 may be referred to as local models which are trained on local data gathered via sensors and other input mechanisms or devices available to a given service edge device 300. Service edge devices 300 may include, but are not limited to, smart phones, smart wearables (e.g., watches, glasses, biometric and health devices, etc.), tablets, laptops, smart cars (i.e., cars connected to a communication network), and a large plurality of internet-of-things devices. Any suitable device that is able to collect data and transmit data over a communication network may be eligible to be a service edge device.

According to an embodiment, a service intermediary server 320 may select a subset of service edge devices 300 to be designated as "learners". An edge device may be selected as a learner for example, because it had a good communication channel condition in regards to acceptable latency limits. Each device within the selected subset of edge devices uploads its local model updates 310 to service intermediary server 320 which aggregates 322 the received local model update parameters (e.g., weights, thresholds, biases, etc.) and then computes new global model parameters using the aggregated local updates. The computed new global model parameters are then applied to update the advanced global model 324 stored and operating within the server 320. Once the global model has been updated, the model may be tested to validate accuracy of the model under the influence of the aggregated and computed new global model parameters. Manual verification may be conducted using a set of test data selected and prepared by a data scientist or analyst affiliated with a business enterprise. In other embodiments, the server 310 may perform autonomous verification by using a set of test data and determining if a predefined output accuracy threshold is surpassed or not. Then the newly updated advanced global model is downloaded 330 to service edge devices 300 which may then use the downloaded model as its new updated local model. The updated local model(s) may be used to facilitate VA functions and actions as well as generate suggestions and optimizations in response to edge device user queries in real time. The updated local models continue learning and training on locally gathered data in order to refine the local model parameters. In this way service edge devices 300 may be ready to upload local model updates 310 to service intermediary server 310 when selected, thus repeating the process and flow of data.

Figure 4:
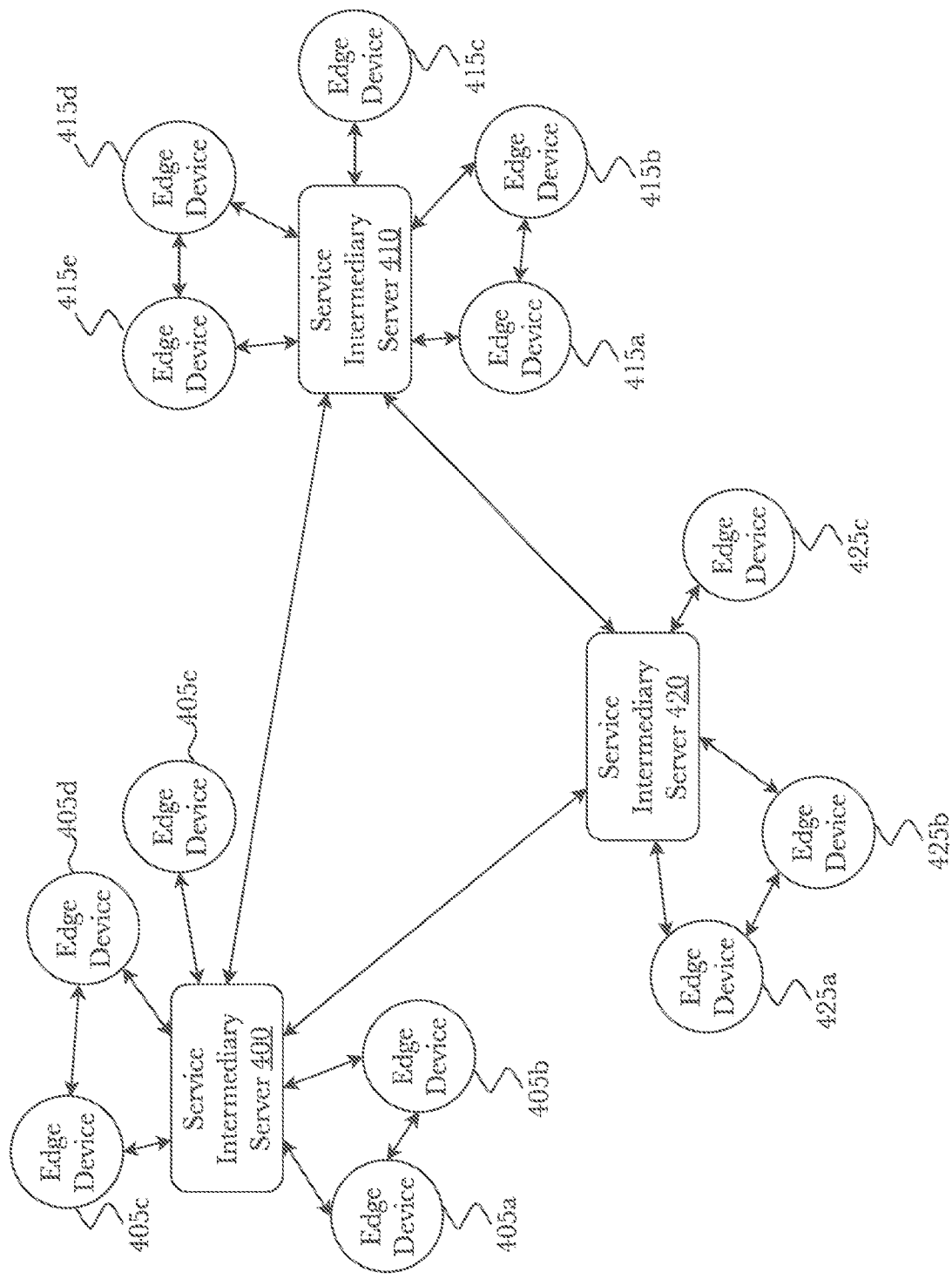
FIG. 4 is a diagram illustrating an exemplary federated awareness architecture for an intelligent service intermediary system, according to an aspect.

FIG. 4 is a diagram illustrating an exemplary federated architecture for an intelligent service intermediary system, according to an aspect. The term federated in general sense means a group of semi-autonomous entities exchanging information with each other. A real-world example of this would be looking at different states of a country which are managed by the state governments. They are partially self-governing and exercise power to keep things operating smoothly. Then those state governments share information with each other and a central government making a complete autonomous government.

According to an embodiment, a federated network has devices called service intermediary servers 400, 410, and 420. A large plurality of service edge devices 405a-e, 415a-e, 425a-c, acting as nodes, may be subscribed to the service intermediary servers 400, 410, and 420. Several servers may exist in the network. These servers are linked to and share information with each other. In the event the communication link between servers breaks temporarily, the network can still run and operate. Edge devices may still communicate with each other via servers they are subscribed to. The servers may facilitate edge device discovery without having the system scan through the network trying to discover nodes, which is time and resource consuming. Service intermediary servers 400, 410, and 420 may collect data from their subscribed edge devices. Additionally, the servers may periodically select a subset of edge devices from which to receive their updated local model parameters, in order for the server requesting the update to aggregate and compute new global model parameters from the received local model parameters.

The subset of edge devices may be chosen from the set of edge devices subscribed to a given service intermediation server, and alternatively, the subset may be chosen from the set of edge devices subscribed to a different server. For example, service intermediary server 400 may request local model updates from its subscribed edge devices 405a-e and the edge devices 425a-c subscribed to service intermediary server 420. In this scenario, edge devices 425a-c would first send their updated local models to server 420, then server 420 can forward that data to service intermediator server 400 where the updated local models from edge devices 425a-c and 405a-e may be aggregated and new global model parameters computed. In one embodiment, each server in the network may store the same global models and when one server updates its global model parameters, it can send the updated global models to the other servers in the network. In this way multiple service intermediary servers 400, 410, and 420 may act as a central unified server, despite the distributed architecture of the system. Servers that share and use the same global models make the system robust against network errors. For example, if service intermediary server 410 were to become disconnected from the system network, any of the remaining service intermediary servers 400, 420 may pick up the slack and connect with service edge devices 415a-e to facilitate continued network viability while maintaining the same global models and thus the same network functionality.

Figure 5:
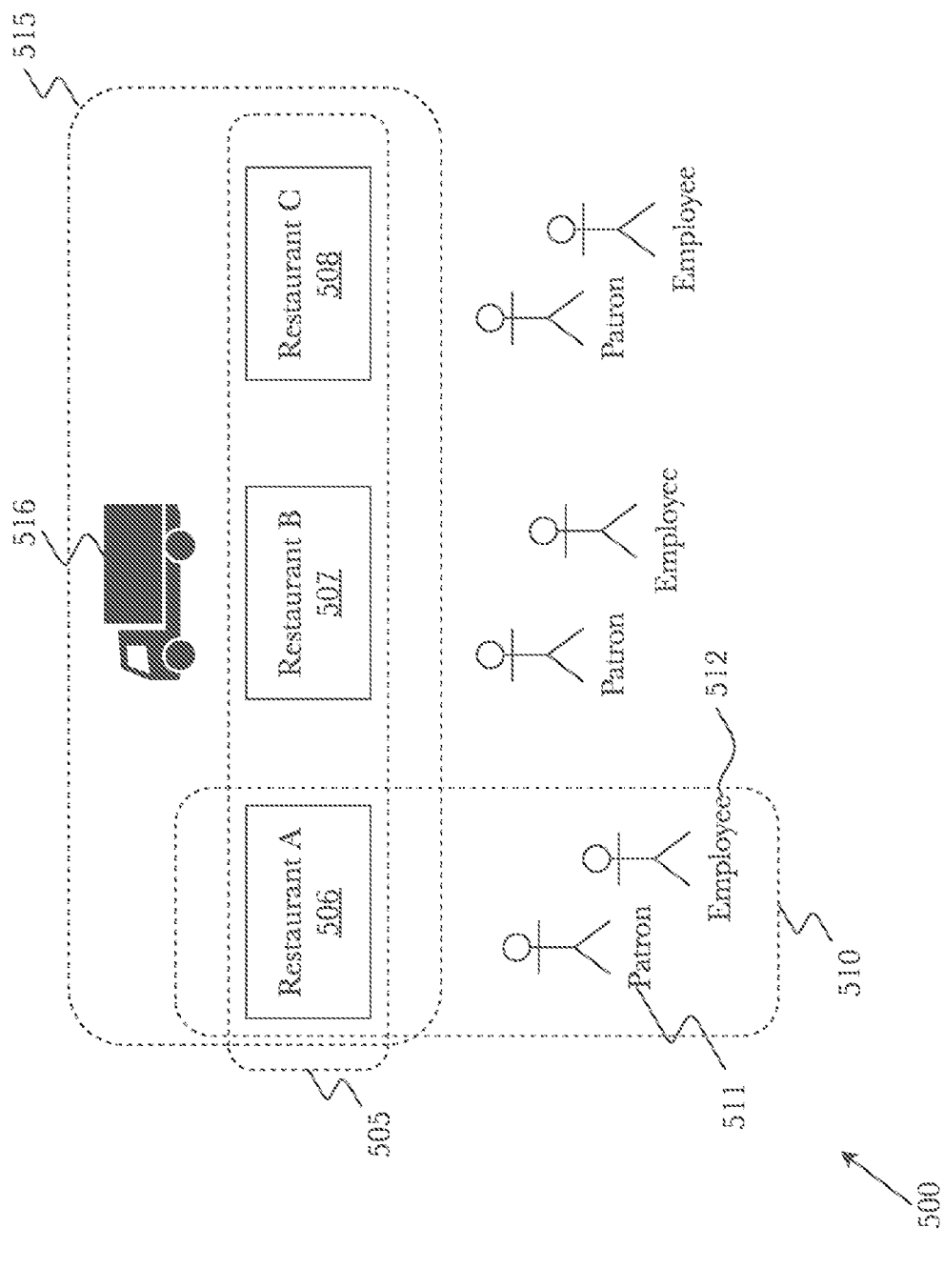
FIG. 5 is a diagram illustrating a plurality of exemplary awareness layers, according to an aspect.

FIG. 5 is a diagram illustrating a plurality of exemplary awareness layers 500, according to an aspect. According to an embodiment, intelligent service intermediary system may utilize a federated awareness architecture where groups of selected service edge devices are placed in an awareness layer. Service edge devices in an awareness layer may be able to recognize each other and share data amongst each other. Service edge device in an awareness layer may make predictions and optimizations based upon the current state of the devices operating within a layer. Awareness layers may be rigidly constructed in that they are only able to recognize and communicate with other devices in the same layer, or awareness layers may be loosely constructed in that the layers are amorphous and can include any service edge device that comes in close proximity to the awareness layer. For example, awareness layer 505 comprises restaurants A 506, B 507, and C 508 and those restaurants may have been grouped together for a variety of reasons, such as due to their geolocation (e.g., they are all located on the waterfront). Within this layer 505, the intelligent service intermediary system may utilize it artificial intelligence capabilities, supported by machine and deep learning models contained in both service edge devices and the service intermediary server, in order to optimize the grouped restaurant's service and operations. For example, restaurant A 506 may need to order more to-go containers, but its distributor has already made its deliveries for the day, whereas restaurant B 507 may have extra to-go containers that they could sell to restaurant A 506. Furthermore, the intelligent service system may be able to access the distributor's pricing and determine a fair price for restaurant B 507 to sell it's to-go containers to restaurant A 506. Because both restaurant A and B are within the same awareness layer 505, the system AI, via the virtual assistant, could send a suggestion to the manager of restaurant B 507 to sell X amount of to-go containers for Y price to restaurant A 506. If the manager of restaurant B 507 agrees to the suggestion then the system could send an alert to the service edge device of the manager of restaurant A 506 informing him of the potential transaction.

A service edge device may be included in more than one awareness layer. For example, restaurant A 506 is part of awareness layer 505, but it may also be a part of an awareness layer 510 that applies to all service edge devices located within restaurant A 506. In this awareness layer 510 the restaurant is aware of the service edge devices associated with patrons 511 and employees 512, and may be able to make suggestions and optimizations using devices operating within that layer 510. For example, as soon as patron's service edge device (i.e., smart phone) recognizes it is in a participating restaurant, it may begin recording background sounds in order to obtain any data that may be used to determine the context or situation for a patron's visit to the restaurant. Continuing the example, a patron is next on the waitlist to be seated, but has been speaking to someone in their dinner party that they hope they won't be late to the movie they were planning on seeing after their meal. This voice data may be analyzed by the patron's or restaurants NLU models to determine that person is in a rush, and that they are getting anxious about being able to complete their meal in time. In response, the intelligent service intermediary system may instruct the virtual assistant operating on the patron's smart phone to present a menu and take the patron's party order, then forward the food order to the restaurant edge device (e.g., point-of-sale device) so that the patron's order may begin being prepared such that it is ready when the patron is finally seated. At the same time, the server who is responsible for the section of the restaurant where the patron was seated may be informed via their service edge device that this patron is in a hurry and that they would prefer expedited service. In this way, the system may provide a better experience to the patron, may improve patron sentiment and brand loyalty to the restaurant for being accommodating, and may increase the profits (i.e., tips) the server makes by delivering fast and efficient service.

A third awareness layer 515 is shown in the diagram which contains the restaurants 506, 507, 508 and one or more distributors 516. This layer need not include patrons and employees because this layer was selected to focus on the logistics and supply chain of the restaurants operating within the layer. The system may make predictions and optimizations on a per restaurant basis, or it may make predictions and optimizations using all the restaurants contained in the same awareness layer 515. For example, a group of restaurants may be located in the same geographic location and they may all purchase from one or more of the same distributors. In this case, the intelligent service intermediary system may suggest that distributor drivers 516 deliver to the all the restaurants in a given geographic location in order to reduce time and resources used by the distributor. Additionally, the system may be able to access distributor 516 data such as schedules and routes in order to suggest optimal delivery routes for drivers.

By implementing a federated awareness architecture with awareness layers, the intelligent service intermediary system can operate as a single central intelligence that is aware of the overall state of all participants, without necessitating all participants be aware of all other services and service edge devices. This allows service edge devices and the machine and deep learning models contained therein to be agile operating on local data, and only requesting global and external data when necessary to carry out VA functions and processes, and when needed to execute service actions suggested by the service intermediary server.

Detailed Description of Exemplary Aspects

Figure 6:
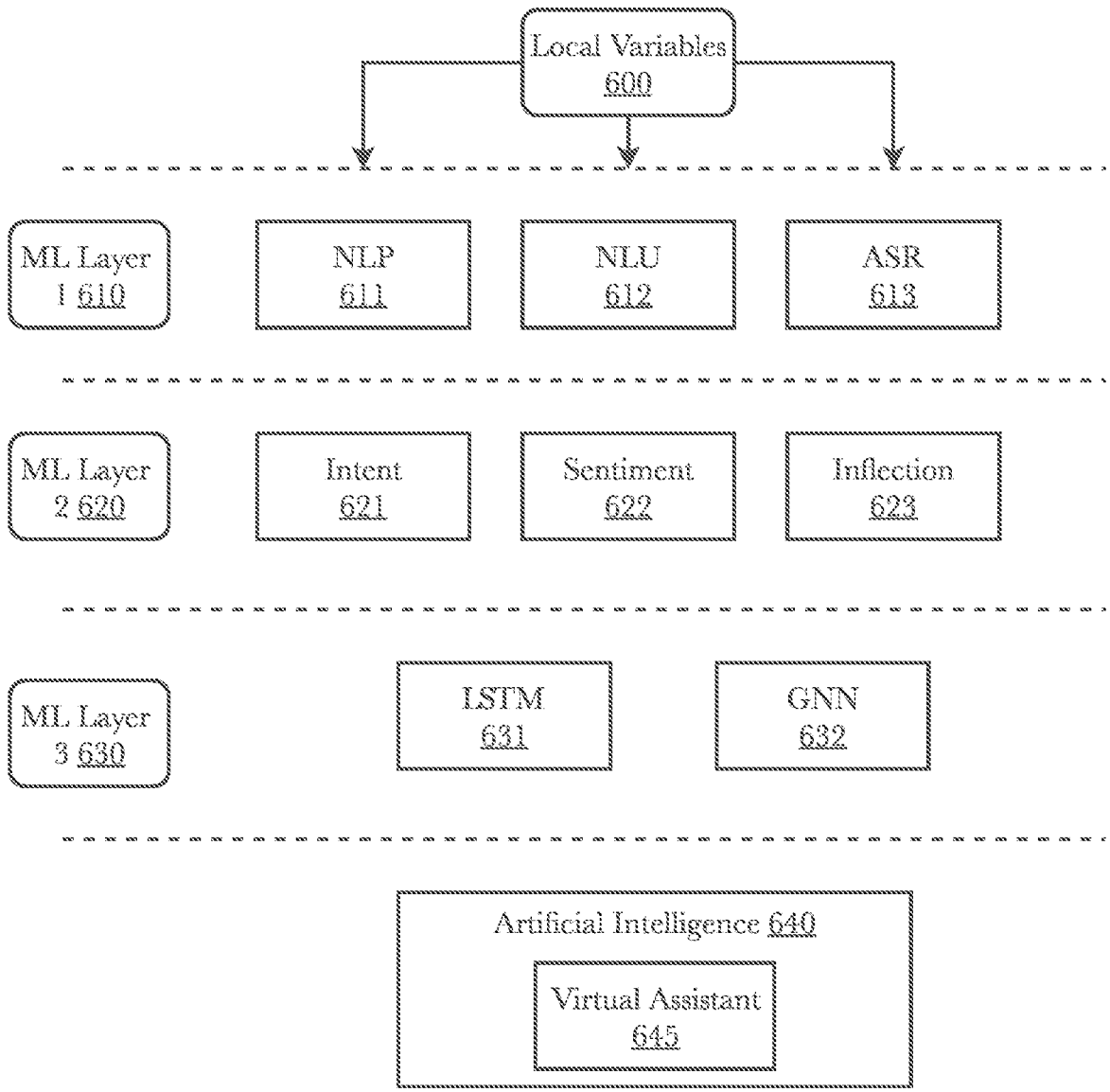
FIG. 6 is a diagram illustrating exemplary machine and deep learning layers that may be implemented and utilized by an intelligent service intermediary system, according to an aspect.

FIG. 6 is a diagram illustrating exemplary machine and deep learning layers that may be implemented and utilized by an intelligent service intermediary system, according to an aspect. According to an embodiment, a service intermediary system may include one or more machine and deep learning layers 610, 620, and 630 stored in and operating on a service intermediary server 110 and service edge devices 130. The ML layers 610, 620, and 630 may be located in advanced ML engine 112 and local ML engine 135. In this exemplary diagram the ML layers 610, 620, and 630 are located in a service edge device 130 and are using local variables 600 as input into the one or more machine learning algorithms. Local variables 600 may include, but are not limited to, location, weather, time, schedule and calendar information, audio data, text data, call data, application data, emails, user preferences, user financial data, context-sensitive business rules, and device sensor data. Furthermore, global and external data may be retrieved from a service intermediary server 110 and other external sources and used as input into the ML layers 610, 620, and 630.

Local variables 600 such as audio and text data generated by the device user may be passed through a first ML layer 610 which may include natural language processing 611, natural language understanding 612, and automated speech recognition 613 algorithms and models which may be used as a first filter for speech and text data in order to determine what a user speech or text query was about. Local variables 600 may then pass through a second ML layer 620 which may include algorithms and models for determining or deriving user intent 621, sentiment 622, and inflection 623 based upon the user's spoken or text query. Intent 621 and sentiment 622 may be used with other local variables to determine the context and situation associated with a user query, and to suggest appropriate actions and functions responsive to a user query. Local variables 600 and previous ML layer outputs may be used as inputs into a third ML layer 630 which may use one or more neural networks to classify received data and create an intelligence layer that can make predictions and optimizations using all available local data, and in some use cases and embodiments, global and external data as well. For example, ML layer three 630 may contain a long short term memory neural network 631 for classification, simulation, prediction, and optimization. In place of, or in addition to LSTM 631, a graph-based neural network ("GNN") 632 may implemented for classification, simulation, prediction, and optimization tasks. According to an embodiment, outputted predictions and optimizations from this ML layer 630 may be used as suggested service actions which may be executed or recommended by a virtual assistant operating on a service edge device 130. Variables and state information (e.g., data representing the current operating state of the device) may pass through one or more machine and deep learning algorithms and through one or more ML layers 610, 620, and 630 to train and inform an artificial intelligence 640 that supports virtual assistant 645 functionality and capability.

Figure 7:
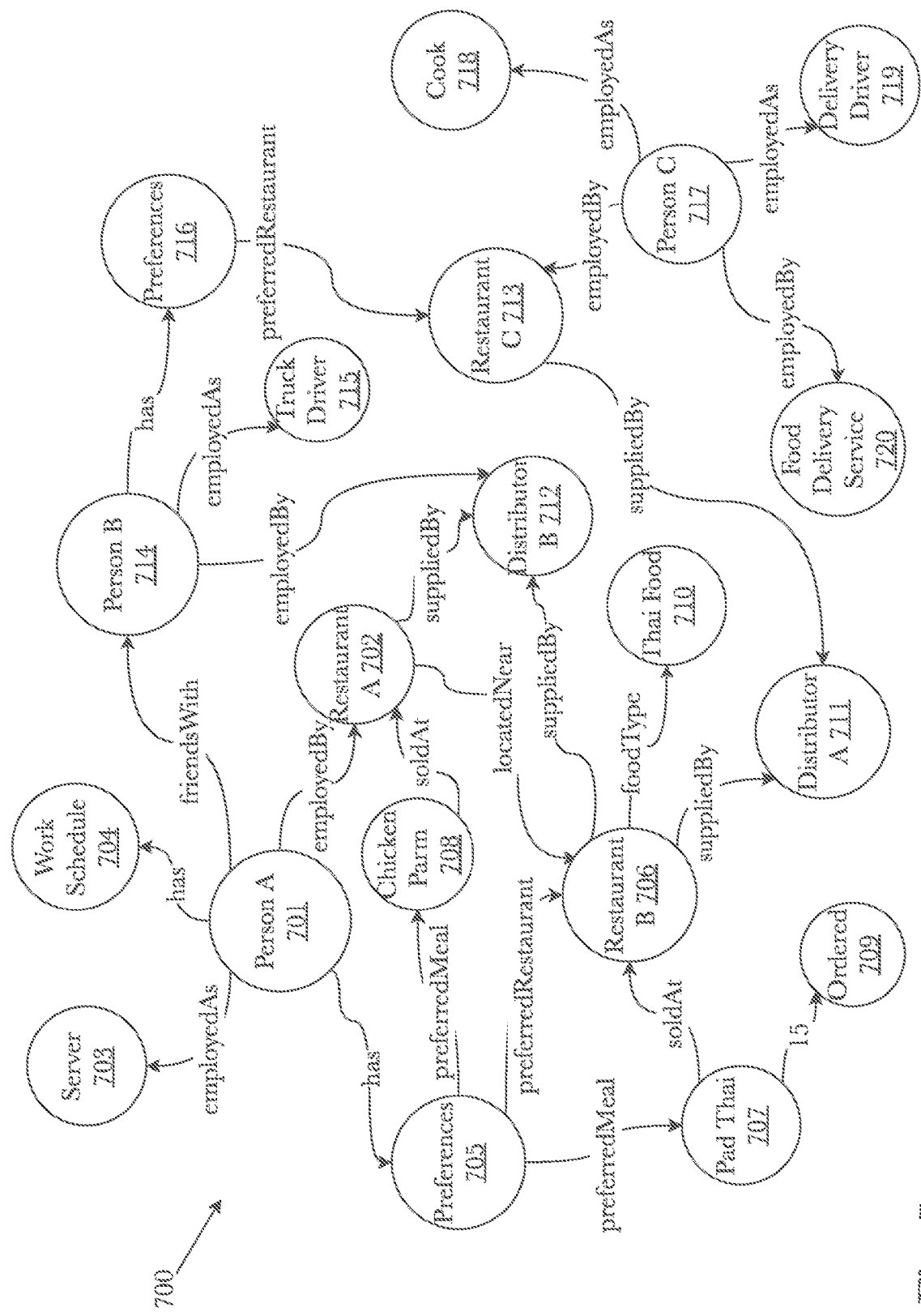
FIG. 7 is a diagram illustrating an exemplary graph neural network for mapping the relationships between various actors, according to an aspect.

FIG. 7 is a diagram illustrating an exemplary graph neural network 700 for mapping the relationships between various actors, according to an aspect. According to an embodiment, a graph-based neural network may be used to map the large plurality of system actors and users of an intelligent service intermediary system 100. GNNs are a class of powerful representation learning algorithms that map the discrete structure of a graph, e.g., nodes and edges, to a continuous vector representation trainable via stochastic gradient descent. These representations may be used as input to classification and regression algorithms for prediction and optimization tasks. The GNN may comprise a plurality of nodes which contain a data structure comprising a value, condition, or other information. Connecting nodes to each other or to themselves are edges which contain information about the relationship between interconnected and self-connected nodes. The GNN may map as nodes participating service actors including, but not limited to, consumers, restaurant managers and other staff, delivery drivers, and distributors. A variety of graph traversal and optimization algorithms known in the art may be used to simulate and predict service actions which may be sent to and executed by actors and/or service edge devices.

In this diagram the node for person A 701 has edges connecting to a variety of other nodes. The edges describe the relationship between person A 701 and the linked nodes, for example relationships may be denoted as "employedAs", "employedBy", "soldAt", and "suppliedBy", to name a few. According to the graph, person A 701 is employed by restaurant A 702 as a server 703 and has a work schedule 704. Additionally, person A 701 has consumer preferences 705 regarding his dining and ordering preferences. For example, person A 701 may have listed restaurant B 706 as a preferred restaurant for dinning and ordering food from, and may have listed one or more preferred meals such as the pad Thai 707 entree sold at restaurant B 706 and the chicken parmesan 708 sold at restaurant A 702. The map may further contain information about a person's preferred meals, such as the how many times the preferred meal has been ordered from a restaurant, as illustrated by the edge indicating that the pad Thai 707 has been ordered 709 15 times by person A 701. Preferences may be manually input into an application operating on a person's service edge device and connected to service intermediary server 110, or preferences may be inferred and learned by the GNN model via the service edge device 130 or by the service intermediary server 110, or preferences may be determined via some combination of manual user input and system learning.

Restaurant B 706 may be connected to the node Thai food 710 via an edge that defines the type of food prepared and sold by restaurant B 706. Restaurant B 706 may purchase food and other supplies from distributor A 711 and distributor B 712, which also supplies restaurant A 702. Another connection that restaurants A 702 and B 706 share is that they are located near each other, such as in the same retail complex, on the same block, or located on the same street. Restaurant C 713 also purchases from and is supplied by distributor A 711. The service intermediary server 110 may use the connections and relationships between and among various nodes in order to predict and suggest service actions in order to optimize participants roles and functions. For example, the system may suggest distributor B 712 to align restaurant A 702 and restaurant B 706 delivery schedules due to their proximity to each other so that distributor B 712 can deliver to both restaurants on the same day, by the same driver, on the same route in order to optimize the distributor's time and resources.

Person A 701 may be friends with person B 714 as denoted by the edge connecting those two nodes. Person B 714 also has connections to nodes representing data and information about person B 714. For instance, person B 714 is employed by distributor B 712 as a truck driver 715, and person B 714 also has consumer preferences. Restaurant C 713 is a preferred restaurant for person B 714. A participant may have multiple service roles such as person C 717 who is employed as both a cook 718 at restaurant C 713 and a delivery driver 719 for a food delivery service 720. This simplified graph representation is for exemplary purposes to illustrate the utility of mapping actors and entities and their relationships to each other in order to organize and find hidden connections within the massive amount of data that is collected via service edge devices 130 and the service intermediary server 110.

Figure 8:
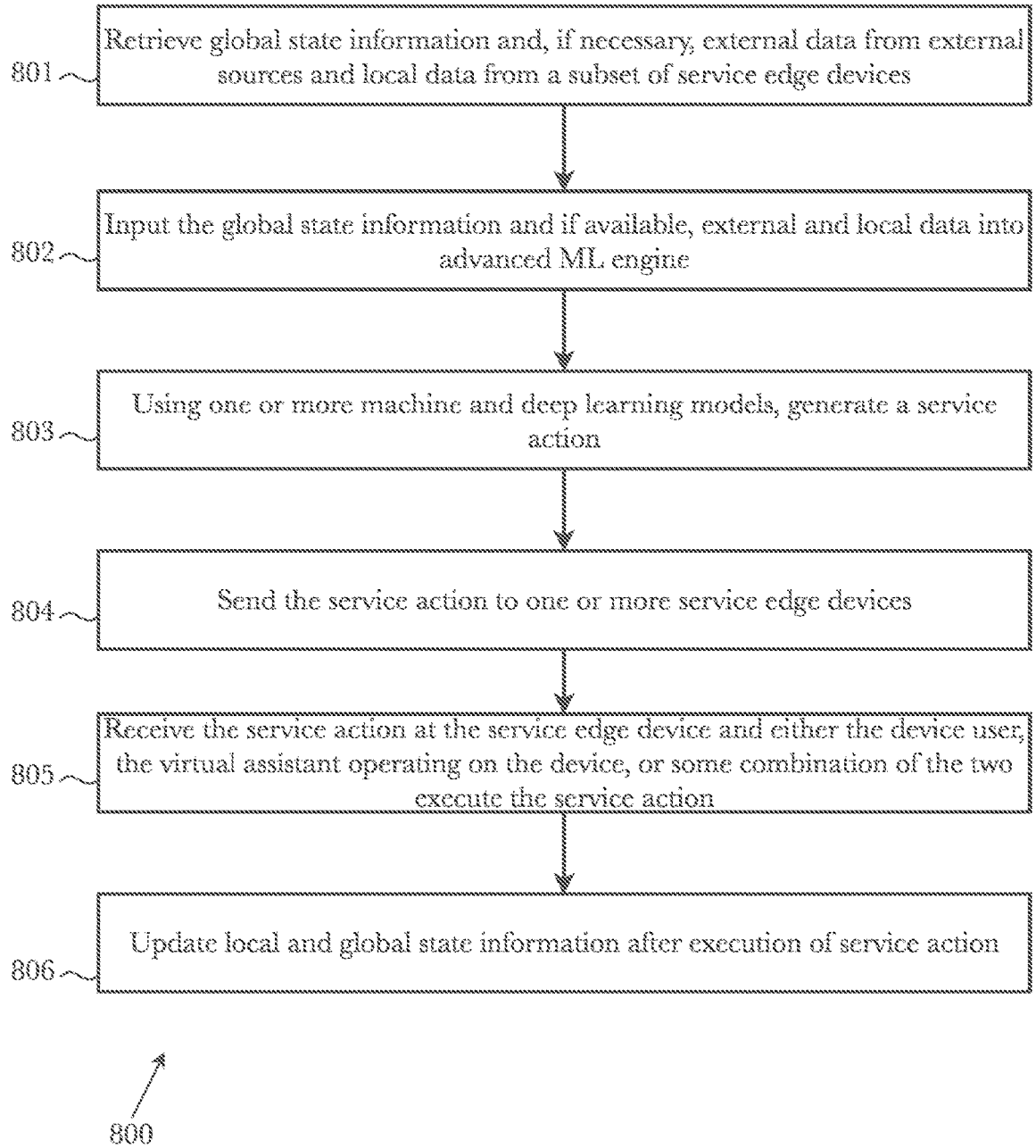
FIG. 8 is a flow diagram illustrating an exemplary method for intelligent service intermediation, according to an aspect.

FIG. 8 is a flow diagram illustrating an exemplary method 800 for intelligent service intermediation, according to an aspect. According to an embodiment, a process for intelligent service intermediation may begin when a service intermediation server retrieves global state information 801 regarding the current state of all service edge devices connected to the network. At this step the server may also retrieve external data from external sources and/or local data from a subset of service edge devices if necessary, to generate intelligent choices. Next, the global data, and if available external and local data is used as input into an advanced ML engine 802 operating within the server. Additional information stored within the database(s) located in the server may be retrieved and used as input. Using one or more of the machine and deep learning models operating within the advanced ML engine, generate a service action 803. A service action may be generated using outputted predictions and optimizations. Service actions may be used for example, to enhance the experience of consumers and enhance the profitability, reputation, and logistics of a business by intermediating actions, processes, and functions between and among intelligent intermediation system participants. The generated service actions may then be sent to one or more service edge devices 804 which are associated with the services or participants included in the service action. The service edge device(s) may receive the service action from the server and either the device user, the virtual assistant operating on the device, or some combination of the two, may execute the service action 805. After the service action has been executed, the service edge device may update its current local state information, and in turn the service intermediation server may update its global state information 806.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 9:
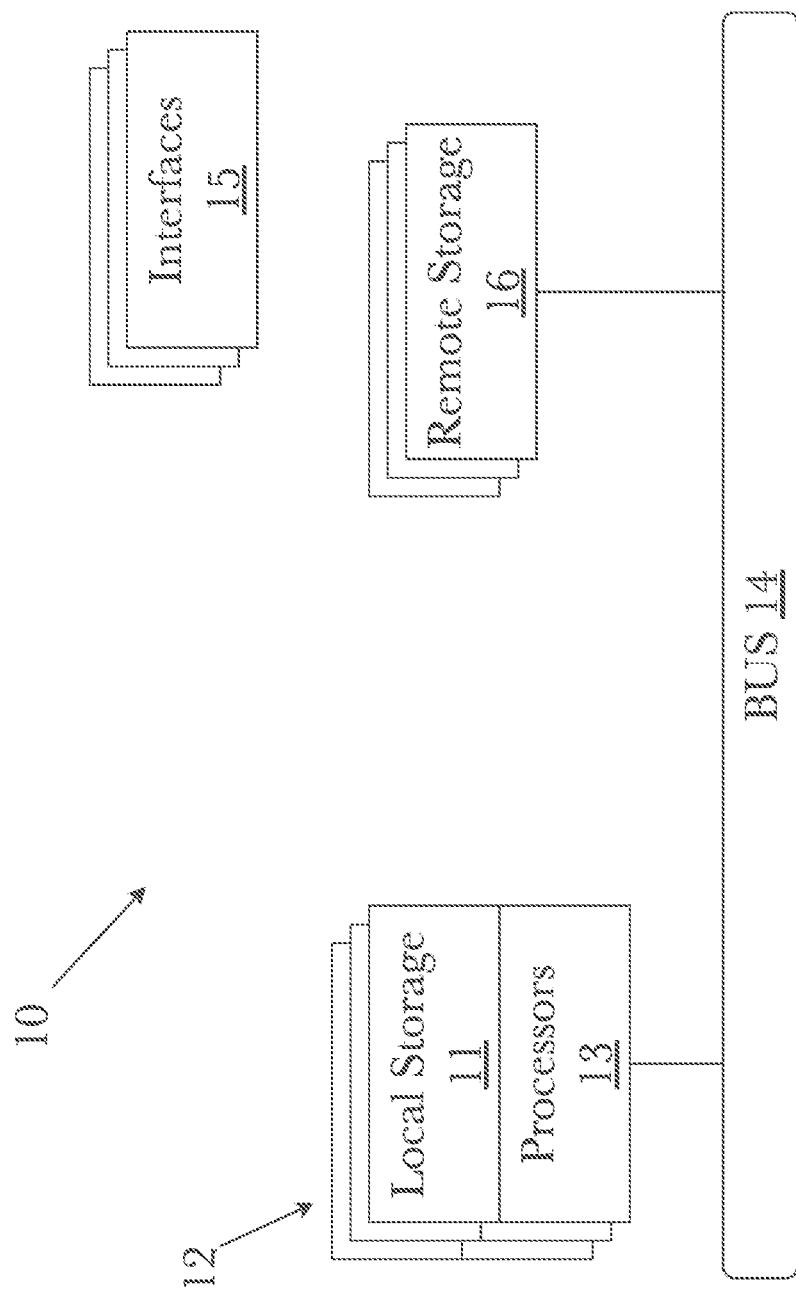
FIG. 9 is a block diagram illustrating an exemplary hardware architecture of a computing device.

Referring now to FIG. 9, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOL™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 9 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 10:
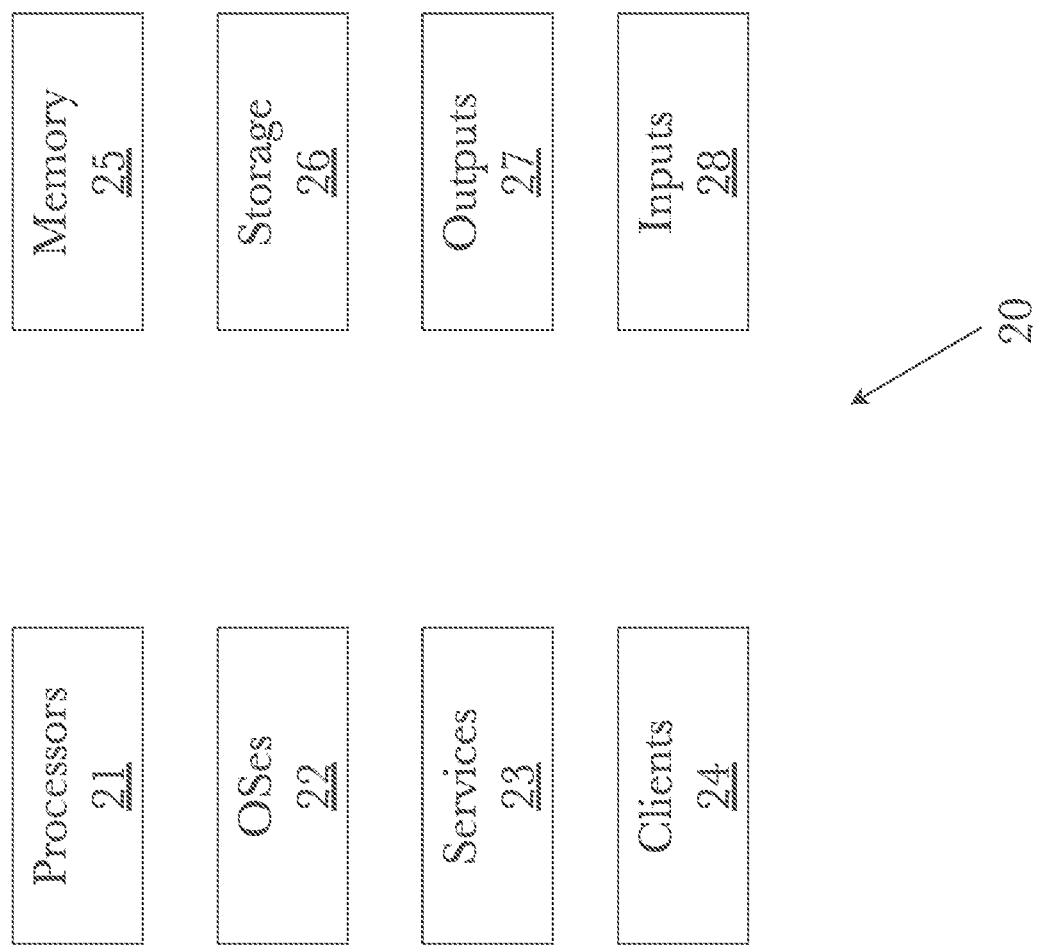
FIG. 10 is a block diagram illustrating an exemplary logical architecture for a client device.

In some aspects, systems may be implemented on a standalone computing system. Referring now to FIG. 10, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 9). Examples of storage devices 26 include flash memory, magnetic hard drive, CD-ROM, and/or the like.

Figure 11:
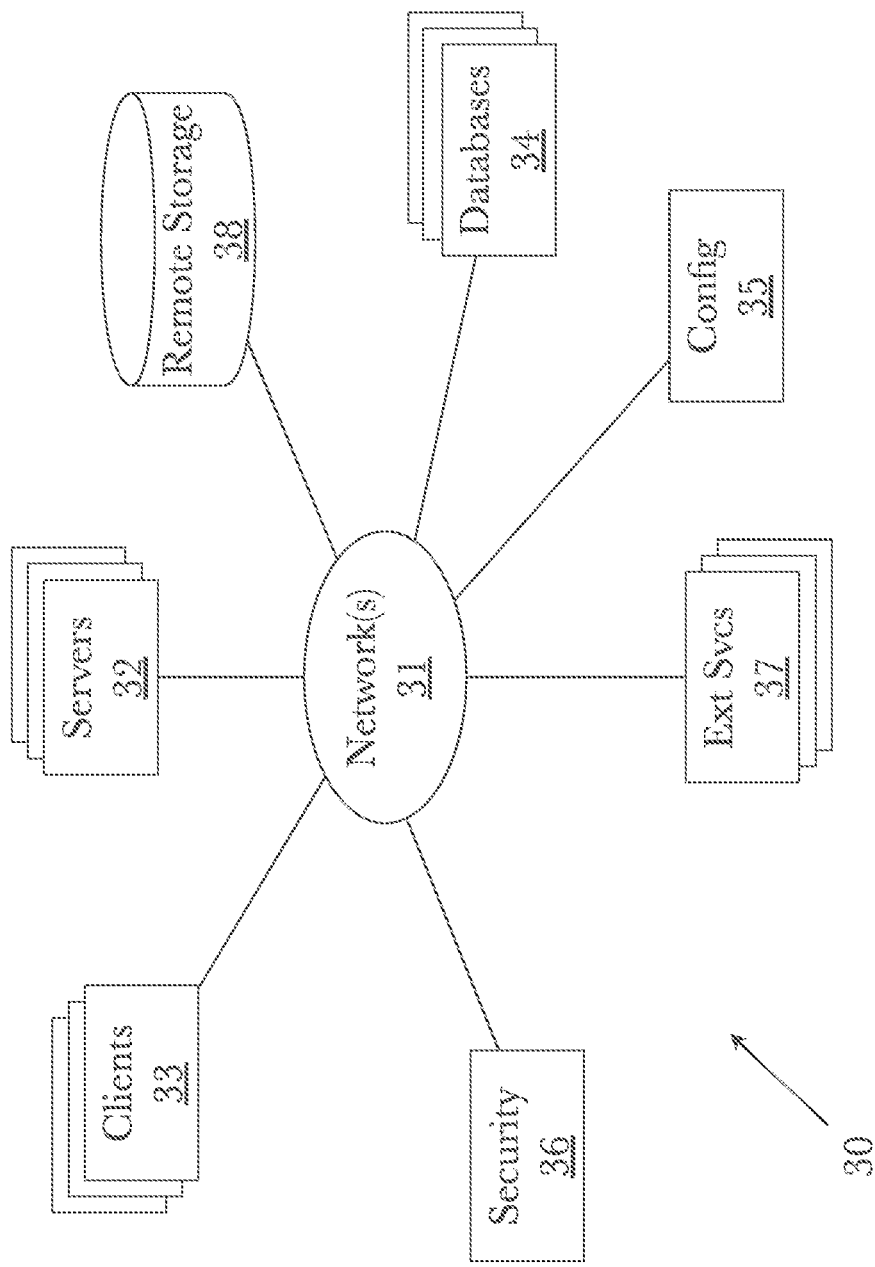
FIG. 11 is a block diagram showing an exemplary architectural arrangement of clients, servers, and external services.

In some aspects, systems may be implemented on a distributed computing network, such as one having any number of clients and/or servers. Referring now to FIG. 11, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 10. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 12:
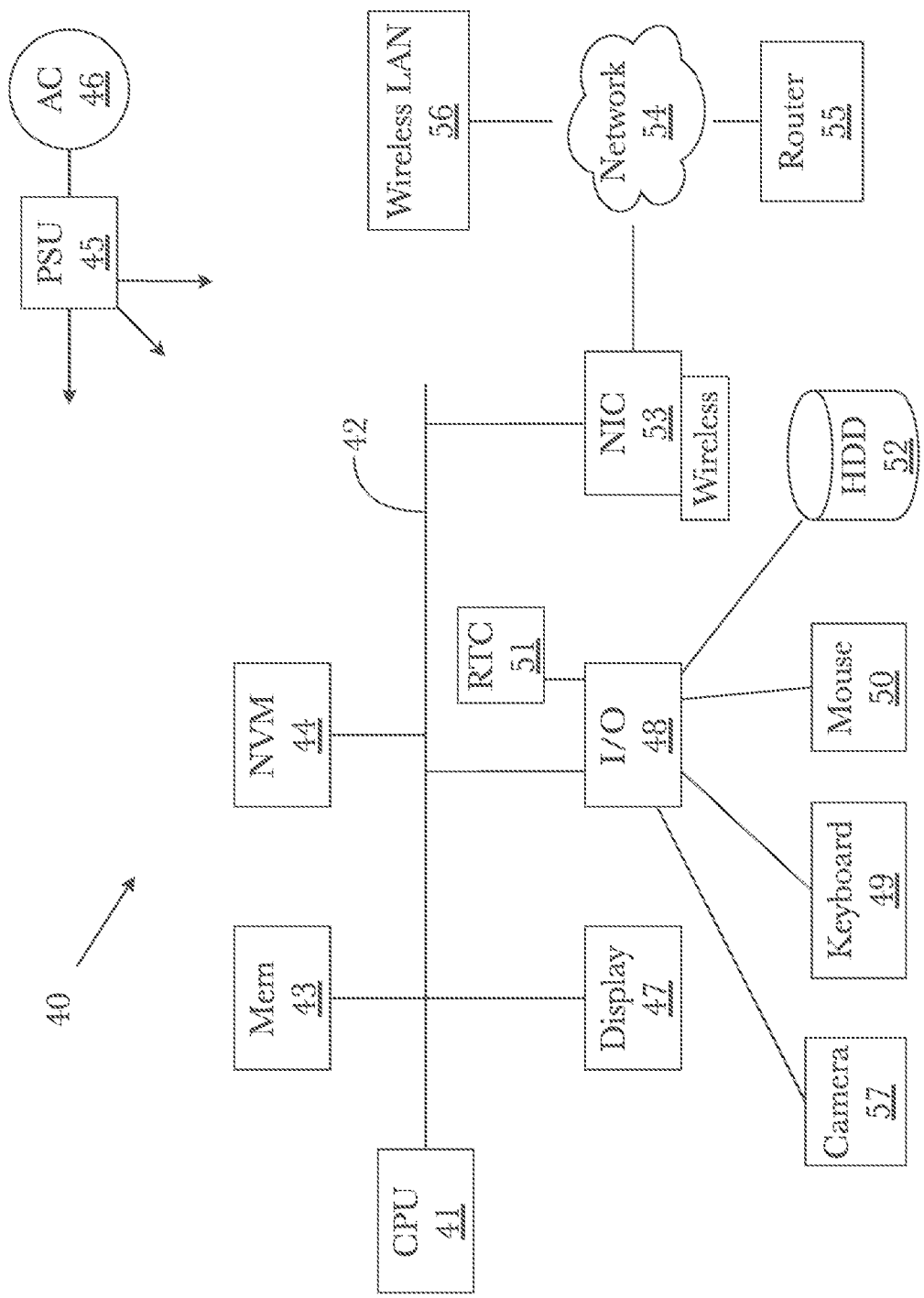
FIG. 12 is another block diagram illustrating an exemplary hardware architecture of a computing device.

FIG. 12 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for intelligent service intermediation, comprising:
   one or more service edge devices comprising a plurality of programming instructions stored in a memory of, and operating on at least one processor of, a computing device, wherein the plurality of programming instructions, when operating on the at least one processor, causes the computing device to:
   receive updated local machine and deep learning global model parameters;
   apply the updated local machine and deep learning global model parameters to the local models stored in the service edge device;
   receive local data from service edge device sensors;
   feed the received local data as input into one or more of the updated local machine and deep learning models to generate output actions responsive to a service edge device user query;
   execute output actions and set up processes necessary for fulfillment of the service edge device user query;
   generate a voice or text message relayed by a virtual assistant indicating that the service edge device user query has been received, understood, and an action responsive to the user query has been initialized or completed;
   train and update local machine and deep learning models using the received local data;
   upload trained and updated local model parameters to a service intermediary server; and
   execute service actions received from a service intermediary server; and
   a plurality of service intermediary servers arranged as a federated network in which each service intermediary server of the plurality of service intermediary servers is linked to, and configured to share information with, each of the other service intermediary servers, and wherein each service intermediary server comprises a plurality of programming instructions stored in a memory of, and operating on at least one processor of, a computing device, wherein the plurality of programming instructions, when operating on the at least one processor, causes the computing device to:
   select a subset of service edge devices to which to upload trained and updated local model parameters, wherein at least one of the service edge devices selected is subscribed to a different service intermediary server of the plurality of service intermediary servers arranged as a federated network from the service intermediary server of the plurality of service intermediary servers arranged as a federated network performing the selection;
   aggregate the received updated local model parameters from the subset of service edge devices and compute the average value of the local model parameters;
   update the local machine and deep learning global models using the computed average values of the local model parameters as new global model parameters;
   send the updated local machine and deep learning global models to the one or more service edge devices;
   receive and store global data from service edge devices and external sources;
   feed the global data into the local machine and deep learning global models to generate as output a service action; and
   send the service action to one or more service edge devices for execution;
   wherein the local machine and deep learning global models comprise a graph-based neural network.

2. The system of claim 1, wherein the local machine and deep learning models comprise a natural language understanding model.

3. The system of claim 1, wherein the local machine and deep learning models determine context-sensitive intent and sentiment when generating output actions.

4. The system of claim 1, further comprising a discriminator comprising a plurality of programming instructions stored in a memory of, and operating on at least one processor of, the computing device of each service edge device, wherein the plurality of programming instructions, when operating on the at least one processor, causes the computing device to:
request global and external data from one of the plurality of service intermediary servers; and
determine which service edge device functions and processes may be executed using only local data, determine which functions and processes can begin while global and external data are being retrieved, and determine which functions and processes cannot begin until global and external data are received.

5. The system of claim 4 further comprising context-sensitive business rules stored in the memory of each service edge device, wherein the context-sensitive business rules may be used by the discriminator when determining when to request and wait for global and external data from the service intermediary server.

6. The system of claim 1 further comprising a service intermediator comprising a plurality of programming instructions stored in a memory of, and operating on at least one processor of, a computing device, wherein the plurality of programming instructions, when operating on the at least one processor, cause the computing device to:
select a subset of service edge devices to comprise an awareness layer wherein each of the service edge devices in the awareness layer are configured to recognize one another and share data with one another;
coordinate distribution of service actions among service edge devices within the awareness layer;
receive requests for global and external data; and
forward global and external data to the service edge devices in the awareness layer.

7. A method for intelligent service intermediation, comprising the steps of receiving updated local machine and deep learning global model parameters;
applying the updated local machine and deep learning global model parameters to the local models stored in the service edge device;
receiving local data from service edge device sensors;
feeding the received local data as input into one or more of the updated local machine and deep learning models to generate output actions responsive to a service edge device user query;
executing output actions and set up processes necessary for fulfillment of the service edge device user query;
generating a voice or text message relayed by a virtual assistant indicating that the service edge device user query has been received, understood, and an action responsive to the user query has been initialized or completed;
training and updating local machine and deep learning models using the received local data;
uploading trained and updated local model parameters to a plurality of service intermediary servers arranged as a federated network in which each service intermediary server of the plurality of intermediary servers is linked to, and configured to share information with, each of the other service intermediary servers; and
executing service actions received from a service intermediary server;
selecting, using a service intermediary server of the plurality of service intermediary servers, a subset of service edge devices to which to upload trained and updated local model parameters, wherein at least one of the service edge devices selected is subscribed to a different service intermediary server of the plurality of service intermediary servers arranged as a federated network from the service intermediary server of the plurality of service intermediary servers arranged as a federated network performing the selection;
aggregating the received updated local model parameters from the subset of service edge devices and compute the average value of the local model parameters;
updating the local machine and deep learning global models using the computed average values of the local model parameters as new global model parameters;
sending the updated local machine and deep learning global models to the one or more service edge devices;
receiving and storing global data from service edge devices and external sources;
feeding the global data into the local machine and deep learning global models to generate as output a service action; and
sending the service action to one or more service edge devices for execution;
wherein the local machine and deep learning global models comprise a graph-based neural network.

8. The method of claim 7, wherein the local machine and deep learning models comprise a natural language understanding model.

9. The method of claim 7, wherein the local machine and deep learning models determine context-sensitive intent and sentiment when generating output actions.

10. The method of claim 7, further comprising the steps of:
requesting, by one of the service edge devices, global and external data from one of the plurality of service intermediary servers; and
determining which service edge device functions and processes may be executed using only local data, determining which functions and processes can begin while global and external data are being retrieved, and determining which functions and processes cannot begin until global and external data are received.

11. The method of claim 10, further comprising context-sensitive business rules stored in the memory of the service edge device, wherein the context-sensitive business rules may be used by the discriminator when determining when to request and wait for global and external data from the service intermediary server.

12. The method of claim 7, further comprising the steps of:
selecting a subset of service edge devices to comprise an awareness layer wherein each of the service edge devices in the awareness layer are configured to recognize one another and share data with one another;
coordinating distribution of service actions among service edge devices within the awareness layer;
receiving requests for global and external data; and
forwarding global and external data to the service edge devices in the awareness layer.

* * * * *